*Loomis, Winters & Stark,*
*Pump.*
No. 112,157. Patented Feb. 28, 1871.
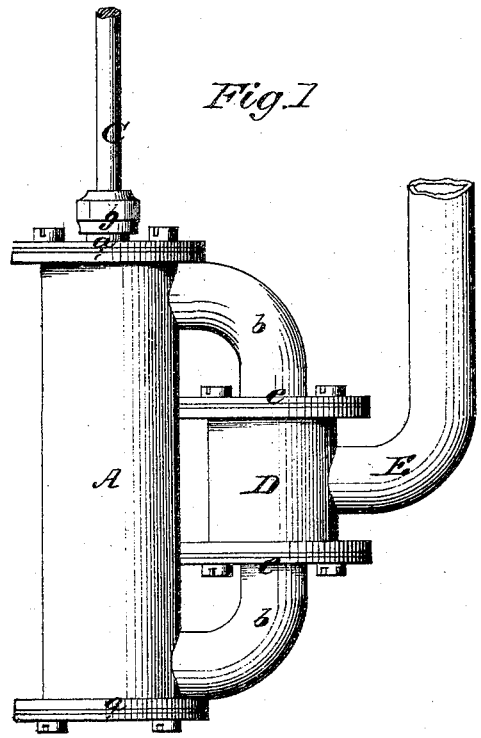
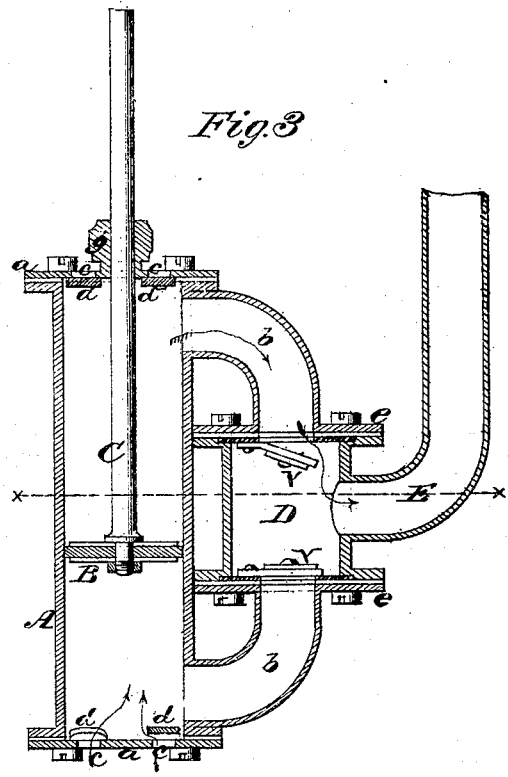
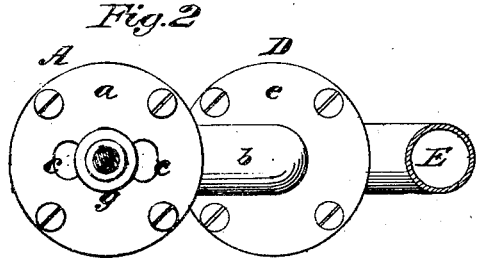
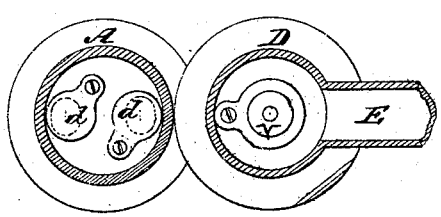
Witnesses.
R. S. Campbell
J. M. Campbell
Inventors
D. Loomis
J. Winters
A. Stark
by
Mason, Fenwick & Lawrence

UNITED STATES PATENT OFFICE.

DAVID LOOMIS, JOY WINTERS, AND ALBERT STARK, OF CLYDE, OHIO.

IMPROVEMENT IN PUMPS.

Specification forming part of Letters Patent No. 112,157, dated February 28, 1871.

*To all whom it may concern:*

Be it known that we, DAVID LOOMIS, JOY WINTERS, and ALBERT STARK, of Clyde, in the county of Sandusky and State of Ohio, have invented a new and useful Improvement in Pumps; and we do hereby declare that the following is a full, clear, and exact description thereof, reference being had to the accompanying drawing making part of this specification, in which—

Figure 1 is a side view of the improved pump. Fig. 2 is a top view of the same. Fig. 3 is a diametrical section through the pump; and Fig. 4 is a section through Fig. 3, taken in the horizontal plane indicated by dotted lines $x$ $x$.

Similar letters of reference indicate corresponding parts in the several figures.

The nature of our invention consists in a cylinder having inlet valvular orifices at both ends and a solid piston, for alternately drawing water through said orifices, in combination with a chamber which communicates with said cylinder above and below its piston, and which is provided with an inlet valvular orifice at each end and with a discharge-pipe, all being constructed, arranged, and combined in such manner as to constitute a very simple, cheap, and compact double-acting submerged pump, as will be hereinafter explained.

To enable others skilled in the art to understand our invention, we will explain its construction and operation.

In the accompanying drawing, A represents the main cylinder of the pump having flanges on its extremities, to which are bolted the cylinder-heads $a$ $a$. These heads are packed tightly on their seats, and are perforated at $c$ $c$ for the admission of water. Valves $d$ $d$ are applied to the inlet-orifices $c$ $c$ of each head $a$ for preventing the efflux of water through them. Within this cylinder works a "solid" piston, B, the rod C of which passes up through a stuffing-box, $g$, which is applied to the upper head $a$.

From points near the cylinder-head branch pipes $b$ $b$ extend, which pipes communicate with the ends of a chamber, D, arranged abreast of the cylinder for the purpose of allowing water to be forced into this chamber both during the ascending and descending strokes of the piston B.

Each head $e$ of the chamber D is provided with a valve, V, for preventing regurgitation of water from said chamber into the cylinder A.

From the chamber a pipe, E, ascends for conducting the water forced out of it wherever it may be desired.

It will be seen from the above description that when the piston B is depressed, the entire pump being submerged, water will enter cylinder A at its upper end and fill this cylinder. Upon drawing up the piston again the water above it in cylinder A will be forced through the upper pipe $b$ into the upper end of the chamber D. At the same time water will be drawn into cylinder A through its bottom head; then, upon depressing the piston again, the water which was last drawn into the cylinder below it will be forced through the lower branch pipe $b$ into the chamber D at the lower end thereof. By thus continuing the movements of the piston water will escape from pipe E in a continued stream.

We do not claim to be the inventors of a cylinder, piston, branch passages, and connecting-chamber and discharge-pipe combined; but What we do claim as our invention, and desire to secure by Letters Patent, is—

The piston-cylinder A, with flanged branches $b$ $b$ formed on it, in combination with the flanged cylinder D, with valves connected to it, substantially in the manner shown and described.

DAVID LOOMIS.
JOY WINTERS.
ALBERT STARK.

Witnesses:
MATTHIAS BENNER,
MANASSEH GROVER.